US012728653B2

(12) United States Patent
Warashina et al.

(10) Patent No.: US 12,728,653 B2
(45) Date of Patent: Sep. 8, 2026

(54) LIQUID EJECTION DEVICE

(71) Applicant: SEIKO EPSON CORPORATION, Tokyo (JP)

(72) Inventors: So Warashina, Shiojiri (JP); Takeshi Komaki, Shiojiri (JP); Noboru Otsuki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 145 days.

(21) Appl. No.: 18/240,552

(22) Filed: Aug. 31, 2023

(65) Prior Publication Data

US 2024/0066894 A1 Feb. 29, 2024

(30) Foreign Application Priority Data

Aug. 31, 2022 (JP) ................................ 2022-137617

(51) Int. Cl.
*B41J 11/00* (2006.01)
*B41J 2/175* (2006.01)
(Continued)

(52) U.S. Cl.
CPC ........... *B41J 11/007* (2013.01); *B41J 2/1752* (2013.01); *B41J 2/185* (2013.01); *B41J 11/58* (2013.01);
(Continued)

(58) Field of Classification Search
CPC ........ B41J 11/007; B41J 2/1752; B41J 2/185; B41J 11/58; B41J 29/02; B41J 2002/1856;
(Continued)

(56) References Cited

U.S. PATENT DOCUMENTS

2003/0156172 A1* 8/2003 Matsuba ................ B41J 29/026 347/86
2015/0077494 A1* 3/2015 Obata .................... B41J 11/007 198/635
(Continued)

FOREIGN PATENT DOCUMENTS

JP 2015080873 A 4/2015
JP 2016043557 A 4/2016
(Continued)

OTHER PUBLICATIONS

Office Action for JP Patent Application No. 2022137617, issued on Jun. 2, 2026, 10 pages.

*Primary Examiner* — Jason S Uhlenhake
*Assistant Examiner* — Alexander D Shenderov
(74) *Attorney, Agent, or Firm* — CHIP LAW GROUP

(57) ABSTRACT

A liquid ejection device includes a medium set section that is configured to set a medium, a support section that is configured to support the medium, a recording section that ejects ink onto the medium supported by the support section to record, a liquid container mounting section to which a liquid container that contains the ink to be supplied to the recording section is attached, and a waste liquid container mounting section to which a waste liquid container that stores ink discharged as waste liquid from the recording section is attached, wherein the liquid container mounting section and the waste liquid container mounting section are provided at position below the support section and overlap with the medium set section as viewed from a direction along a transport direction in which the medium is transported in the support section.

16 Claims, 9 Drawing Sheets

(51) Int. Cl.
*B41J 2/185* (2006.01)
*B41J 11/58* (2006.01)
*B41J 29/02* (2006.01)

(52) U.S. Cl.
CPC ........ *B41J 29/02* (2013.01); *B41J 2002/1856* (2013.01)

(58) Field of Classification Search
CPC ... B41J 2/1721; B41J 29/13; B41J 2/01; B41J 2/175; B41J 13/10
USPC .......................................................... 347/104
See application file for complete search history.

(56) References Cited

U.S. PATENT DOCUMENTS

| | | | | |
|---|---|---|---|---|
| 2015/0109396 | A1 | 4/2015 | Kawamoto | |
| 2016/0052277 | A1 | 2/2016 | Katsuki | |
| 2016/0177116 | A1* | 6/2016 | Katsuragi | B41J 2/2107 347/102 |
| 2017/0106658 | A1 | 4/2017 | Inoue | |
| 2021/0178768 | A1 | 6/2021 | Tanaka | |
| 2021/0283931 | A1 | 9/2021 | Ikagawa et al. | |

FOREIGN PATENT DOCUMENTS

| | | | |
|---|---|---|---|
| JP | 2017077659 | A | 4/2017 |
| JP | 2021094760 | A | 6/2021 |
| JP | 2021142727 | A | 9/2021 |

* cited by examiner

LIQUID EJECTION DEVICE

The present application is based on, and claims priority from JP Application Serial Number 2022-137617, filed Aug. 31, 2022, the disclosure of which is hereby incorporated by reference herein in its entirety.

BACKGROUND

1. Technical Field

The present disclosure relates to a liquid ejection device.

2. Related Art

JP-A-2015-80873 discloses a recording device, which is an example of a liquid ejection device, equipped with a medium holding section holding a roll of cylindrically wound medium, and a recording section that records by ejecting ink onto the medium transported from the medium holding section and supported by a support member. The medium holding section is an example of a medium set section that can be set medium. In addition, the support member is an example of a support section capable of supporting the medium.

This recording device also discloses that the medium holding section is located vertically below the support member. It is also disclosed that in this recording device, a pair of container mounting sections that detachably mount containers containing ink, and a collection body mounting section that detachably mounts a collection body for collecting waste liquid, located adjacent to the medium holding section in a direction that intersects the medium transport direction of the support member. The container mounting section is an example of a liquid container mounting section. The collection body is an example of a waste liquid container, and the collection body mounting section is an example of a waste liquid container mounting section.

However, in the recording device of the JP-A-2015-80873, since the media holding section and the support member overlap in the vertical direction, the height of the recording device tends to be high. In addition, since the medium holding section and the support member overlap in the vertical direction, the container mounting section or the collection body mounting section is placed in different positions from the medium holding section and the support member. Therefore, the size of the recording device may become larger.

SUMMARY

A liquid ejection device includes a medium set section that is configured to set a medium; a support section that is configured to support the medium transported from the medium set section; a recording section that ejects liquid onto the medium supported by the support section to record on the medium; a liquid container mounting section to which a liquid container that contains the liquid to be supplied to the recording section is attachable and detachable; and a waste liquid container mounting section to which a waste liquid container, which is configured to store the liquid discharged as waste liquid from the recording section, is attachable and detachable, wherein: assuming that a direction in which the medium is transported in the support section is a transport direction, the liquid container mounting section and the waste liquid container mounting section are provided at a position below the support section, the liquid container mounting section and the waste liquid container mounting section being provided at the position that overlap with the medium set section as viewed from a direction along the transport direction.

A liquid ejection device includes a medium set section where a medium is set; a support section that is configured to support the medium transported from the medium set section; a recording section that ejects liquid onto the medium supported by the support section to record on the medium; a liquid container mounting section to which a liquid container that contains the liquid to be supplied to the recording section is attachable and detachable; and a waste liquid container that is configured to store the liquid discharged as waste liquid from the recording section, wherein: assuming that a direction in which the medium is transported in the support section is a transport direction, the liquid container mounting section and the waste liquid container are provided at a position below the support section, the liquid container mounting section and the waste liquid container being provided at the position that overlap with the medium set section as viewed from the direction along the transport direction.

A liquid ejection device includes a medium set section where a medium is set; a support section that is configured to support the medium transported from the medium set section; a recording section that ejects liquid onto the medium supported by the support section to record on the medium; a liquid container that contains the liquid to be supplied to the recording section; and a waste liquid container that is configured to store the liquid discharged as waste liquid from the recording section, wherein: assuming that the direction in which the medium is transported in the support section is the transport direction, the liquid container and the waste liquid container are provided at a position below the support section, the liquid container and the waste liquid container being provided at the position that overlap with the medium set section as viewed from a direction along the transport direction.

DESCRIPTION OF EMBODIMENTS

Hereinafter, the present disclosure will be described based on embodiments. A liquid ejection device is, for example, an inkjet printer that ejects ink, an example of liquid, onto a medium such as paper or fabric for recording.

In each figure, the same symbol is attached to the same members, and redundant explanations are omitted. In this specification, "same," "identical," and "same time" shall not only refer to being exactly the same, but shall also include cases where they are the same in consideration of measurement error, the same in consideration of manufacturing variations of members, and the same to the extent that they do not impair function. Thus, for example, "both dimensions are the same" means that the dimensional difference between the two is within ±10%, more preferably within ±5%, and especially preferably within ±3% of one dimension, taking account measurement errors and manufacturing variations of members.

In each figure, X, Y, and Z represents three spatial axes that are orthogonal to each other. In this specification, directions along these axes are an X-axis direction, a Y-axis direction, and a Z-axis direction. When specifying the direction, a positive direction is "+" and a negative direction is "−," and this positive and negative sign is used together in the directional notation to explain that an arrow in each figure is in the +direction and the opposite direction is the −direction.

The Z-axis direction indicates the direction of gravity, with the +Z direction indicating vertical upward direction and the −Z direction indicating vertical downward direction. For this reason, the Z-axis direction is sometimes referred to as the vertical direction. A plane containing the X-axis and the Y-axis is described as an X-Y plane, a plane containing the X-axis and the Z-axis as an X-Z plane, and a plane containing the Y-axis and the Z-axis as a Y-Z plane. The X-Y plane is also a horizontal plane. Furthermore, the three X, Y, and Z spatial axes, which do not limit the positive and negative directions, are described as the X-axis, the Y-axis, and the Z-axis.

In each figure, the X-axis direction is a depth direction of the liquid ejection device 11 as viewed from the front. The X-axis direction is also the width direction of the medium M. The X-axis is also a width direction of the recording section 20 (will be described later). The +X direction in the X-axis direction is a direction from the front surface of the liquid ejection device 11 toward the rear surface of the liquid ejection device 11. The −X direction is a direction from the rear surface of the liquid ejection device 11 toward the front surface of the liquid ejection device 11. The front surface of the liquid ejection device 11 is a surface where an operation section 15, which is operated by a user to give instructions to the liquid ejection device 11, is located.

1. First Embodiment

Figure 1:
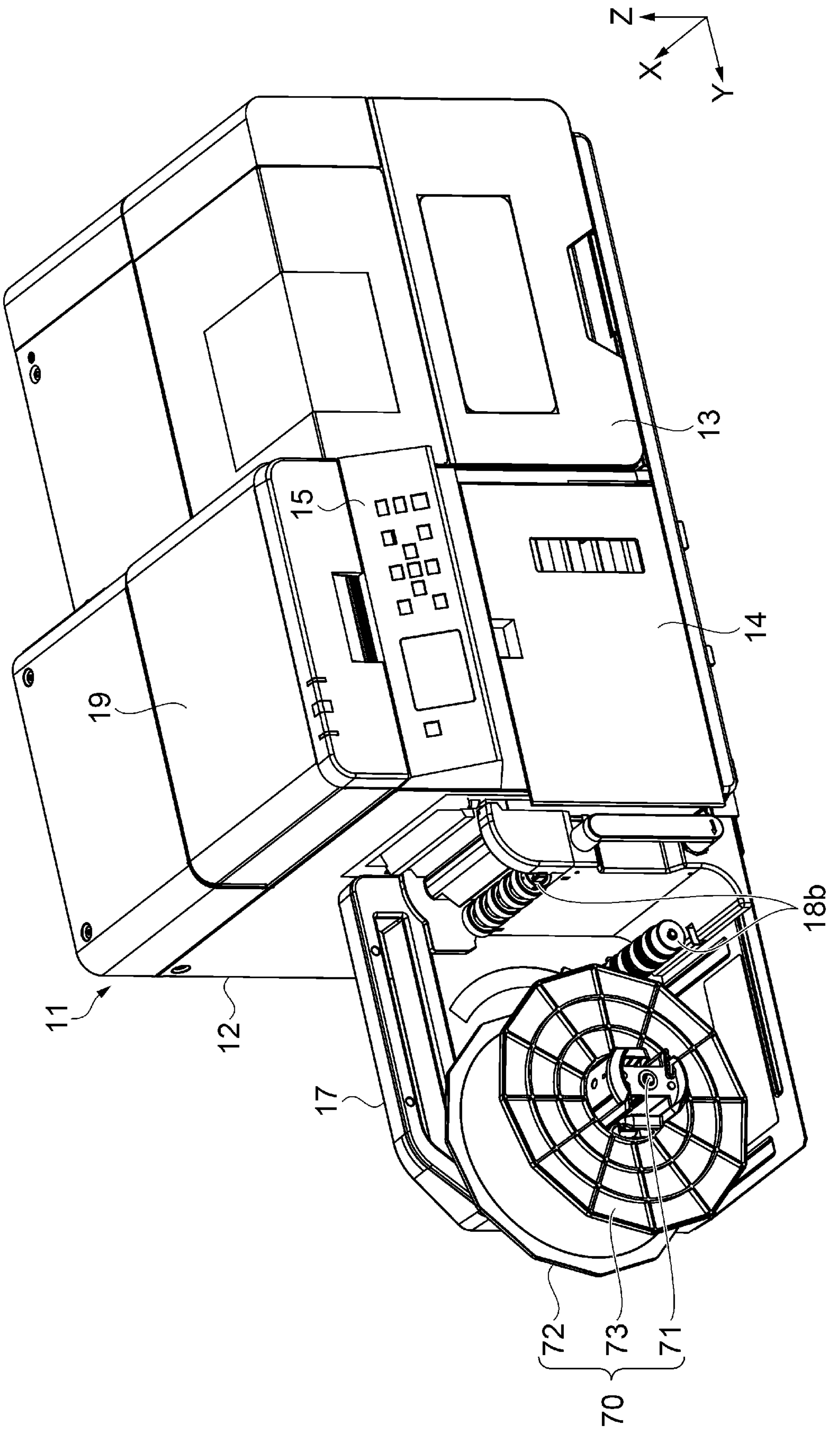
FIG. 1 is a perspective view of a liquid ejection device according to a first embodiment.
Figure 2:
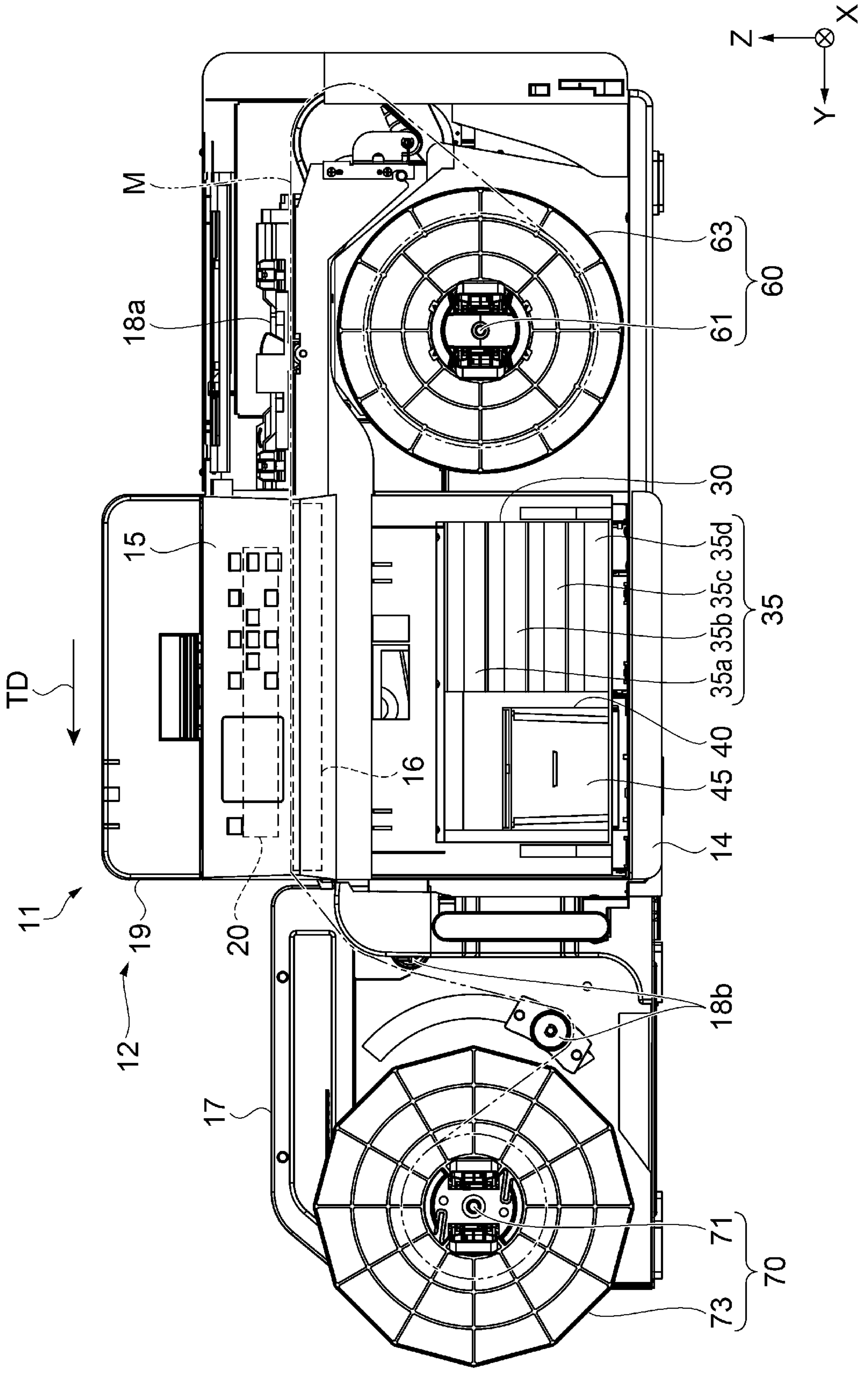
FIG. 2 is a front view of the liquid ejection device.
Figure 3:
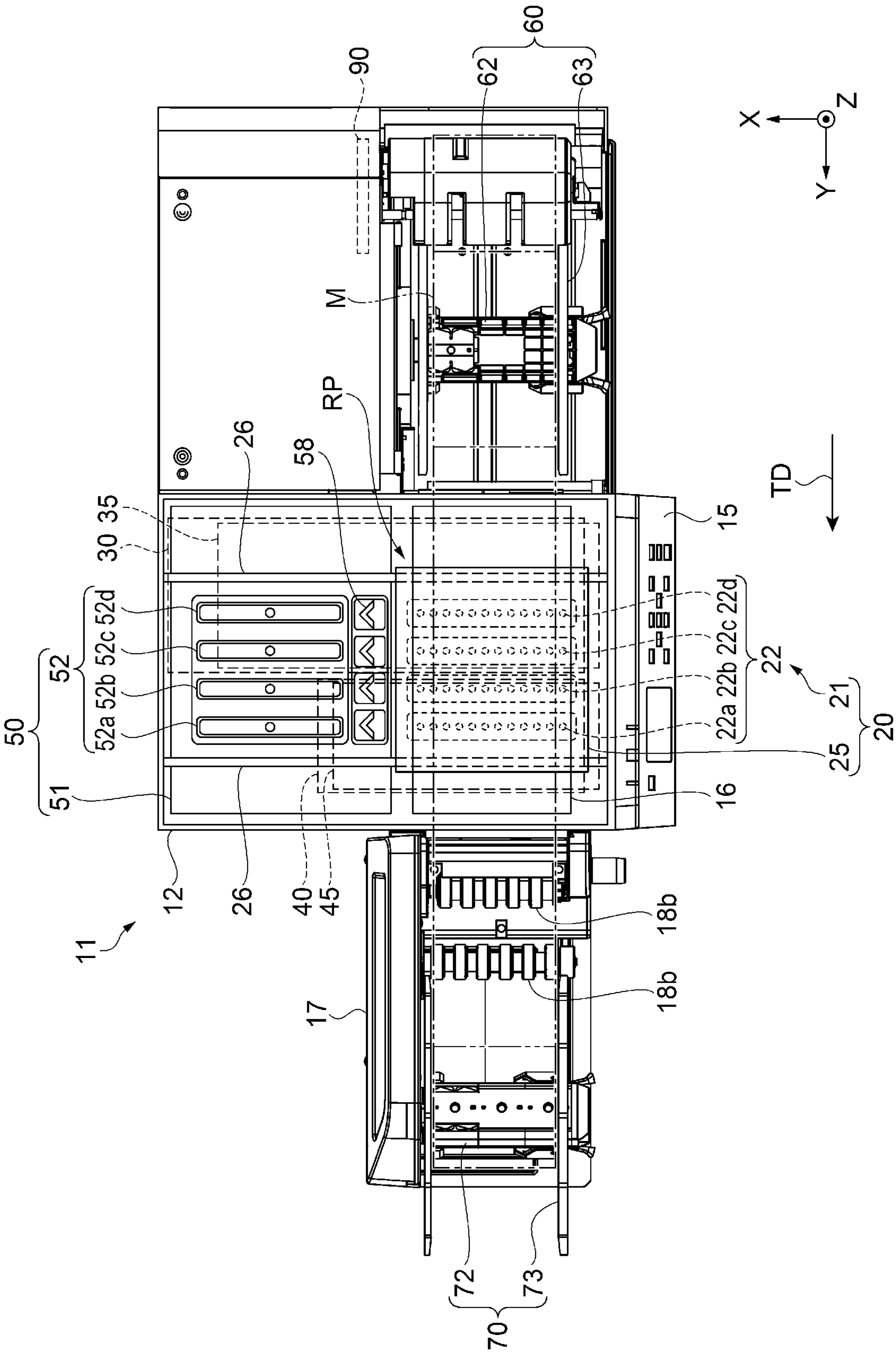
FIG. 3 is a top view of the liquid ejection device.

As shown in FIG. 1, the liquid ejection device 11 has a box-shaped housing 12, an operation section 15 located on the front surface, which is the −X direction side of the housing 12, and a medium receiving section 70 located on the +Y direction side of the housing 12. As shown in FIG. 2 and FIG. 3, the liquid ejection device 11 has a medium set section 60, a support section 16, a recording section 20, a liquid container mounting section 30, a waste liquid container mounting section 40, a maintenance section 50, and a control section 90 in the housing 12.

The housing 12 composed of a frame (not shown) and outer members that is attached to the frame. The housing 12 has a cover 13, a front door 14, and an upper door 19, which constitute the outer members.

The cover 13 is provided on the housing 12 so that it can be slide between a closed position shown in FIG. 1 and an open position that is in the −Y direction of the closed position. The closed position of the cover 13 is a position that covers the medium set section 60. The open position of the cover 13 is a position where the user can access the medium set section 60 from the −X direction side which is the front side of the housing 12 in the depth direction. In FIG. 2, the cover 13 has been removed for explanation.

The front door 14 is provided in the housing 12 so that it can pivot between the closed position shown in FIG. 1 and the open position shown in FIG. 2. The closed position of the front door 14 is the position that covers the liquid container mounting section 30 and the waste liquid container mounting section 40. The open position of the front door 14 is a position where the user can access the liquid container mounting section 30 and the waste liquid container mounting section 40 from the −X direction side.

The upper door 19 is provided in the housing 12 so that it can be pivoted around an axis along the Y-axis located at an end portion of the +X direction side of the upper door 19. The upper door 19 is provided in the housing 12 so that it can pivot between a closed position shown in FIG. 1 and an open position (not shown). The closed position of the upper door 19 is a position that covers the support section 16 and the recording section 20. The open position of the upper door 19 is a position where the user can access the support section 16 and the recording section 20.

The operation section 15 is located on the −X direction side of the housing 12, which is the front side of the housing 12 in the depth direction. The operation section 15 is located, in the Z-axis direction, between the front door 14 and the upper door 19. The operation section 15 has a display section and operation buttons. The user can give various instructions to the liquid ejection device 11 by operating the operation buttons. The operation section 15 may be a display section consisting of a touch panel. In this case, the user can give instructions to the liquid ejection device 11 by touching the display section.

The medium set section 60 is provided in the housing 12 so that the medium M can be set. The medium set section 60 in this embodiment is provided in the housing 12 so that the medium M that is wound in a roll shape can be set. The medium M that is wound in the roll shape to be set in the medium set section 60 may be, for example, a long rolled medium M, or a sheet of medium M attached to a long rolled backing paper.

As shown in FIG. 2 and FIG. 3, the medium set section 60 is rotatably located on a support shaft 61, which is located on the −Y direction side from the center of the housing 12. The support shaft 61 is along the X-axis and extends in the −X direction from the center of the housing 12. The medium set section 60 has a medium holding section 62 and a flange 63.

The medium holding section 62 is rotatably supported by the support shaft 61. The medium holding section 62 has a cylindrical section into which the support shaft 61 is inserted, and a guard section located at one end portion of the cylindrical section. The flange 63 has a through hole into which the cylindrical section of the medium holding section 62 can be inserted. The medium set section 60 can be set with multiple specifications of medium M with different width dimensions. Therefore, the cylindrical section of the medium holding section 62 has several attachment positions for the flange 63 to match the width dimension of the medium M.

When setting medium M in the liquid ejection device 11, the cylindrical section of the medium holding section 62 is inserted into the center hole of the medium M that has been wound in a roll shape. Then, the flange 63 is attached to the cylindrical section of the medium holding section 62, and the medium M is set in the medium set section 60. By inserting the support shaft 61 into the through hole in the cylindrical section of the medium holding section 62, the medium set section 60 with the medium M is attached to the liquid ejection device 11. As a result, the medium set section 60, in which the medium M that has been wound in the roll shape is set, is supported by the support shaft 61 in a rotatable manner.

The media M fed from the medium set section 60 is transported toward the support section 16 by an upstream transport section 18*a*, which is located on the +Z direction side of the media set section 60 supported by the support shaft 61. The upstream transport section 18*a* is a transport mechanism that can transport the medium M toward the support section 16.

The support section 16 is located in the housing 12 so as to be able to support the medium M transported from the medium set section 60. As shown in FIG. 2 and FIG. 3, the support section 16 is located on the +Y direction side from the medium set section 60 and the upstream transport section 18*a*. A support surface of the support section 16 that supports the medium M is a flat surface along the X-Y plane. The dimension of the support surface of the support section 16 in the X-axis direction is the same as or larger than the width dimension of the medium M. The support surface of the support section 16, in the Z-axis direction, is located on the +Z direction side than the medium set section 60. Assuming that a direction in which the medium M is transported in the support section 16 is a transport direction TD, the transport direction TD is a direction along the Y-axis direction.

Figure 4:
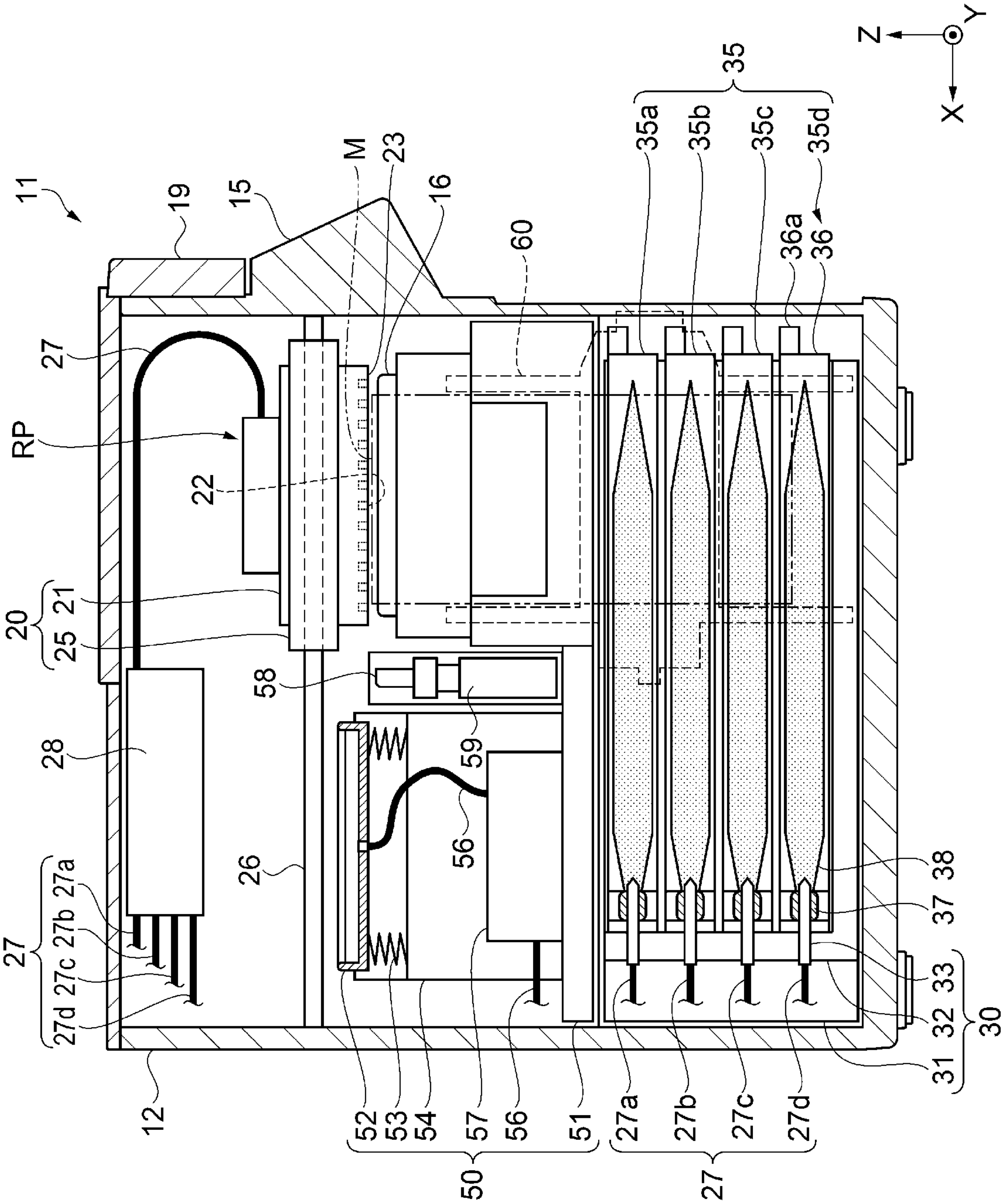
FIG. 4 is a schematic cross-sectional view showing a configuration around a liquid container mounting section.

The recording section 20 records by ejecting ink onto the medium M that is supported by the support section 16. As shown in FIG. 2, the recording section 20 is located in the housing 12 at a position that is the +Z direction side from the support section 16. As shown in FIG. 3 and FIG. 4, the recording section 20 has a liquid ejection head 21 and a head holding section 25 that holds the liquid ejection head 21.

As shown in FIG. 4, the liquid ejection head 21 has a plurality of nozzles 22 that are opened on a nozzle surface 23 located on the −Z direction side of the liquid ejection head 21. As shown in FIG. 3 and FIG. 4, the liquid ejection head 21 has a plurality of nozzle groups 22*a*, 22*b*, 22*c*, and 22*d* extending in the X-axis direction, and ejects ink onto the medium M from the plurality of nozzles 22 comprising the plurality of nozzle groups 22*a*, 22*b*, 22*c*, and 22*d*. The position of the recording section 20 when the liquid ejection head 21 ejects ink onto the medium M is called a recording position RP. At the recording position RP, the nozzle surface 23 and the nozzles 22 of the liquid ejection head 21 of the recording section 20 face the support surface of the support section 16 and the medium M supported by the support section 16.

The liquid ejection head 21 in this embodiment, in the X-axis direction, is a line head with a number of nozzles 22 that can simultaneously eject ink over the entire width region of the medium M. The liquid ejection device 11 performs line printing by ejecting ink from the plurality of nozzles 22 located facing the entire width region of the medium M toward the medium M, which is transported at a constant speed.

The head holding section 25 holds the liquid ejection head 21, which can be moved in the X-axis direction. As shown in FIG. 3 and FIG. 4, the head holding section 25 is supported by a pair of guide shafts 26 provided by the liquid ejection device 11 and is movable in the X-axis direction. Each guide shaft 26 extends along the X-axis. The pair of guide shafts 26 are located in the housing 12, spaced apart in the Y-axis direction. The head holding section 25, which holds the liquid ejection head 21, is supported by the guide shafts 26 so as to be movable in the X-axis direction.

Thereby, the recording section 20 is provided in the housing 12 so that it can move between the recording position RP, which is facing the support section 16, and a standby position SP (see to FIG. 5), which is located away from the recording position RP in the +X direction. In the standby position SP, the recording section 20 faces the maintenance section 50 located on the +X direction side of the support section 16.

As shown in FIG. 1 to FIG. 3, the medium receiving section 70 is located on a receiving frame 17 provided by the liquid ejection device 11 so that the medium M recorded by the recording section 20 can be received. The receiving frame 17 is attached to a side surface of the housing 12 in the +Y direction side. The receiving frame 17 has downstream transport sections 18*b* and a rotation shaft 71.

The medium receiving section 70 is attached to the rotation shaft 71, which is located on the +Y direction side from the support section 16 and the downstream transport sections 18*b*. The rotation shaft 71 is along the X-axis and extends in the −X direction from the receiving frame 17. The rotation shaft 71 is driven by a drive motor (not shown). The medium receiving section 70 has a medium winding section 72 and a flange 73.

The medium winding section 72 is attached to the rotation shaft 71. The medium winding section 72 has a cylindrical section into which the rotation shaft 71 is inserted, and a guard section located at one end portion of the cylindrical section. The flange 73 has a through hole into which the cylindrical section of the medium winding section 72 can be inserted. The medium receiving section 70 can receive multiple specifications of medium M with different width dimensions. Therefore, the cylindrical section of the medium winding section 72 has several attachment positions for the flange 73 to match the width dimension of the medium M.

When setting the medium winding section 72 in the liquid ejection device 11, the medium winding section 72 is attached to the rotation shaft 71 by inserting the rotation shaft 71 into the through-hole in the cylindrical section of the medium winding section 72. The medium M is then wound around the cylindrical section of the medium winding section 72. Before winding the medium M around the cylindrical section of the medium winding section 72, the flange 73 may be attached to the cylindrical section of the medium winding section 72 to match the width dimension of the medium M to be wound. The medium M is then, by the rotation shaft 71 being driven to rotate, wound around the medium receiving section 70 and is received. Thereby, the medium M recorded by the recording section 20 is transported from the support section 16 to the medium receiving section 70.

The downstream transport sections 18*b* are located, in the Y-axis direction, between the support section 16 and the medium receiving section 70 that is set on the rotation shaft 71. The downstream transport sections 18*b* guide the medium M transported from the support section 16 toward the media receiving section 70. The downstream transport sections 18*b* may include tension rollers that adjust a tensile force applied to the medium M.

A liquid container 35 which contains ink to be supplied to the recording section 20 is detachably mounted on the liquid container mounting section 30. As shown in FIG. 2 and FIG.

4, in the housing 12, the liquid container mounting section 30 and the liquid container 35 mounted on the liquid container mounting section 30 are located on the −Z direction side of the support section 16 and the maintenance section 50, which is vertically below the support section 16 and the maintenance section 50. The liquid container mounting section 30 extends in the X-axis direction, which is the depth direction of the housing 12, from an end portion on the −X direction side to an end portion in the +X direction side, within the housing 12. In addition, as shown in FIG. 2 and FIG. 3, the liquid container mounting section 30 and the liquid container 35 mounted on the liquid container mounting section 30 are provided, in the Y-axis direction, between the medium set section 60 and the medium receiving section 70.

As shown in FIG. 4, the liquid container 35 which is mounted on the liquid container mounting section 30 consists of a flexible bag 38, a lead-out port 37 for leading out the ink contained in the bag 38, and a box-shaped case 36 that houses the bag 38 and the lead-out port 37. When the liquid container 35 is mounted on the liquid container mounting section 30, a grip section 36*a* is provided on the sidewall of the case 36 in the −X direction that is located in the −X direction than an end of the liquid container mounting section 30 in the −X direction. The user can easily attach and detach the liquid container 35 to and from the liquid container mounting section 30 by gripping the grip section 36*a*.

The liquid container 35 in this embodiment includes liquid containers 35*a*, 35*b*, 35*c*, and 35*d*. Each liquid container 35*a*, 35*b*, 35*c*, and 35*d* contains one of the following inks: black ink, cyan ink, magenta ink, and yellow ink as an example of ink. The ink contained in each of the liquid containers 35*a*, 35*b*, 35*c*, and 35*d* is supplied to the recording section 20 via a supply tube 27 and a supply mechanism 28.

The supply tube 27 includes supply tubes 27*a*, 27*b*, 27*c*, and 27*d*. The supply mechanism 28 can supply the respective inks contained in the liquid containers 35*a*, 35*b*, 35*c*, and 35*d* to the nozzle groups 22*a*, 22*b*, 22*c*, and 22*d* of the recording section 20. The supply mechanism 28 is, for example, a diaphragm pump connected to the supply tubes 27*a*, 27*b*, 27*c*, and 27*d*.

The liquid container mounting section 30 has a holding case 31 that holds the liquid container 35. The holding case 31 has four holding spaces that can accommodate the liquid containers 35*a*, 35*b*, 35*c*, and 35*d* stacked in the Z-axis direction, which is the up and down direction. An opening is provided at an end portion of the −X direction side of the holding case 31 for inserting the liquid container 35 into the holding space of the holding case 31. As shown in FIG. 4, the liquid container mounting section 30 and the liquid containers 35*a*, 35*b*, 35*c*, and 35*d* mounted in the holding space of the liquid container mounting section 30 are located vertically below the support section 16, that is, in the −Z direction, and overlap the medium set section 60 as viewed from the direction along the Y-axis.

Lead-out pipes 33 are located on a front wall 32 that defines the +X direction side surface of the holding space of the holding case 31. Four lead-out pipes 33 are located up and down direction, that is, in the Z-axis direction, spaced to correspond to each holding case 31, and are connected to the supply tubes 27*a*, 27*b*, 27*c*, and 27*d*. When the liquid containers 35*a*, 35*b*, 35*c*, and 35*d* are mounted in the liquid container mounting section 30, the four lead-out pipes 33 enter the respective lead-out ports 37 of the liquid containers 35*a*, 35*b*, 35*c*, and 35*d*. Thereby, each liquid container 35*a*, 35*b*, 35*c*, and 35*d* connects with the corresponding supply tubes 27*a*, 27*b*, 27*c*, and 27*d*.

Figure 5:
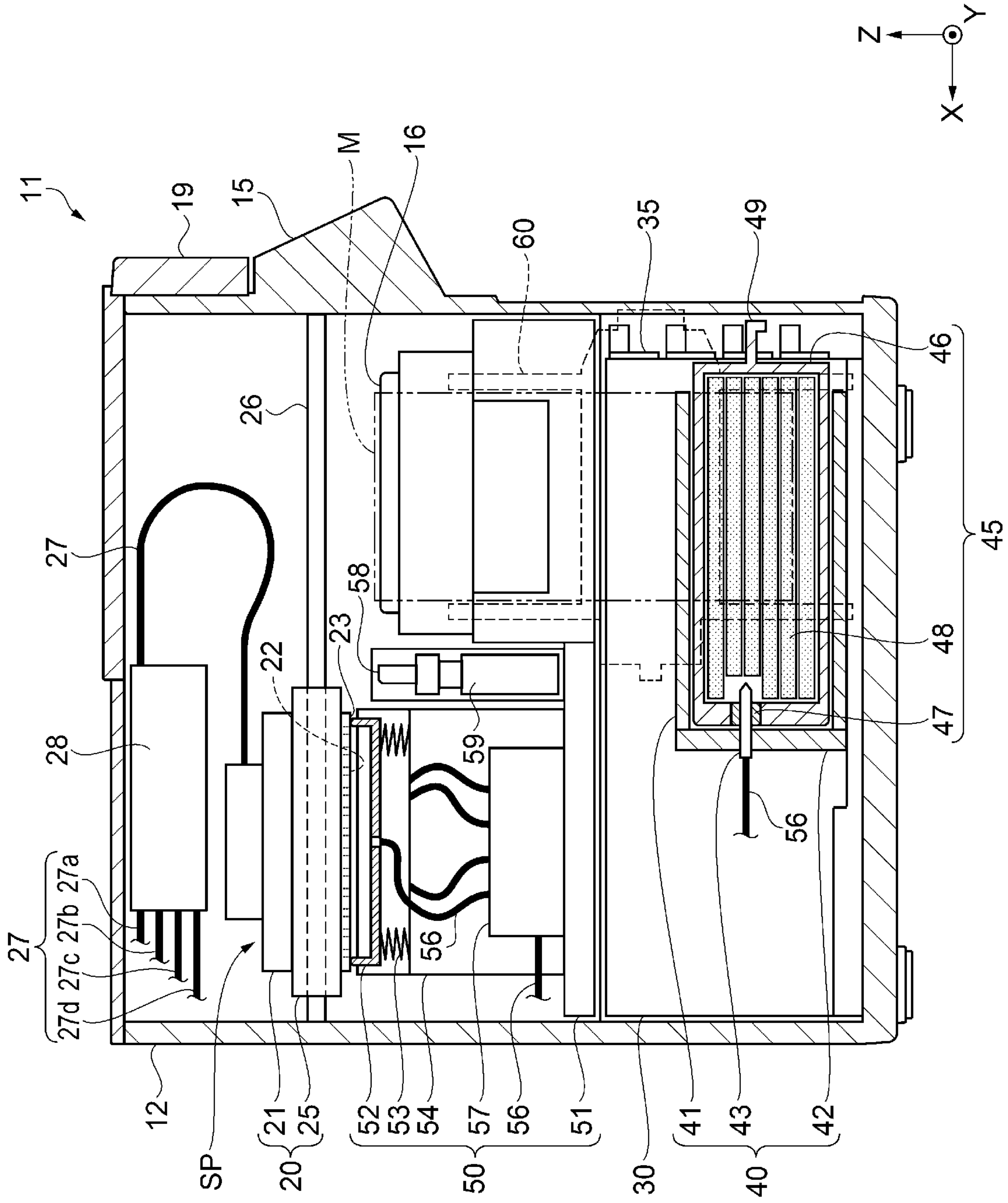
FIG. 5 is a schematic cross-sectional view showing a configuration around a waste liquid container mounting section.

A waste liquid container 45 that can store ink ejected as waste liquid from the recording section 20 is detachably attached to the waste liquid container mounting section 40. As shown in FIG. 2 and FIG. 5, the waste liquid container mounting section 40 and the waste liquid container 45 mounted on the waste liquid container mounting section 40 are located on the −Z direction side, vertically below the support section 16, and the maintenance section 50 in the housing 12. The waste liquid container mounting section 40 extends in the X-axis direction, which is the depth direction of the housing 12, from an end portion of the −X direction side in the housing 12 to a position that is the +X direction side than the center of the housing 12.

As shown in FIG. 2 and FIG. 3, the waste liquid container mounting section 40 and the waste liquid container 45 mounted on the waste liquid container mounting section 40 are located adjacent to the +Y direction side of the liquid container mounting section 30 and the liquid container 35 mounted on the liquid container mounting section 30. In addition, the waste liquid container mounting section 40 and the waste liquid container 45 mounted on the waste liquid container mounting section 40 are located between the medium set section 60 and the medium receiving section 70 in the Y-axis direction.

As shown in FIG. 5, the waste liquid container 45, which is mounted in the waste liquid container mounting section 40, consists of a box-shaped case 46 capable of storing waste liquid, an inlet 47 through which waste liquid is introduced, and an absorbent material 48 capable of holding the liquid stored in the case 46. The absorbent material 48 is composed of an absorbent material that is absorbent and can hold the absorbed liquid, such as a sponge-like porous material or a laminated material made of laminated wastepaper. When the waste liquid container 45 is mounted on the waste liquid container mounting section 40, a grip section 49 is provided on a side wall of the case 46, which is an end portion of the −X direction side of the case 46. The user can easily attach and detach the waste liquid container 45 to and from the waste liquid container mounting section 40 by gripping the grip section 49.

The waste liquid container mounting section 40 has a holding case 41 for holding the waste liquid container 45. The holding case 41 has a holding space that can hold the waste liquid container 45. An opening is provided at an end portion of the −X direction side of the holding case 41 for inserting the waste liquid container 45 into the holding space of the holding case 41. As shown in FIG. 5, the waste liquid container mounting section 40 and the waste liquid container 45 mounted in the holding space of the waste liquid container mounting section 40 are located vertically below the support section 16, that is, in the −Z direction, and overlap with the medium set section 60 as viewed from the direction along the Y-axis.

An introduction pipe 43 is located on a front wall 42 that defines the +X direction side surface of the holding space of the holding case 41. The introduction pipe 43 is connected to the waste liquid tube 56. When the waste liquid container 45 is attached to the waste liquid container mounting section 40, the introduction pipe 43 enters the introduction port 47 of the waste liquid container 45. Thereby, the waste liquid container 45 connects to the waste liquid tube 56.

The maintenance section 50 performs maintenance on the recording section 20. As shown in FIG. 3 and FIG. 4, the maintenance section 50 is adjacent to the +X direction side of the support section 16 in the housing 12. The maintenance section 50 has a maintenance base 51 in a rectangular plate shape, a cap 52, support springs 53 that support the cap 52 so that the cap 52 can move in the Z-axis direction, a cap support section 54 located on the maintenance base 51, a waste liquid tube 56, a suction mechanism 57, wipers 58, and a wiper movement mechanism 59.

As shown in FIG. 5, the maintenance section 50 is located facing the recording section 20 in the standby position SP. As shown in FIG. 3 and FIG. 4, as viewed along vertical direction, that is, the Z-axis direction, the maintenance section 50 overlaps the +X direction side of the liquid container mounting section 30 and the +X direction side of the liquid container 35 attached to the liquid container mounting section 30. In addition, as shown in FIG. 3 and FIG. 5, as viewed along the Z-axis direction, the maintenance section 50 overlaps the +X direction side of the waste liquid container mounting section 40 and the +X direction side of the waste liquid container 45 attached to the waste liquid container mounting section 40.

The cap 52 is supported by a pair of support springs 53 attached to the cap support section 54. The cap 52 is located facing the nozzle surface 23 of the liquid ejection head 21 in the recording section 20 in the standby position SP. By bringing the cap 52 into contact with the nozzle surface 23 of the liquid ejection head 21 of the recording section 20, capping is performed to form capping space in which the openings of the nozzles 22 are opened.

The capping with the cap 52 in the maintenance section 50 prevents ink from thickening in the nozzles 22 of the liquid ejection head 21. As a result, the occurrence of ink ejection failure from the nozzles 22 of the liquid ejection head 21 can be prevented. Therefore, the maintenance section 50 performs maintenance of the recording section 20 by the capping.

As shown in FIG. 3, the cap 52 includes caps 52*a*, 52*b*, 52*c*, and 52*d*. When the maintenance section 50 performs the capping, the cap 52*a* forms a capping space in which the nozzle group 22*a* is opened, the cap 52*b* forms a capping space in which the nozzle group 22*b* is opened, the cap 52*c* forms a capping space in which the nozzle group 22*c* is opened, and the cap 52*d* forms a capping space in which the nozzle group 22*d* is opened.

As shown in FIG. 5, the cap 52 connect to the waste liquid container 45, which is attached to the waste liquid container mounting section 40, via the waste liquid tube 56 and the introduction pipe 43. During the maintenance of the recording section 20, such as cleaning and flushing, the ink ejected from the nozzles 22 of the liquid ejection head 21 and received by the cap 52 is suctioned by the suction mechanism 57 and is sent as waste liquid to the waste liquid container 45 via the waste liquid tube 56 and the introduction pipe 43.

The cleaning refers to an operation in which ink supplied to the recording section 20 is pressurized by the supply mechanism 28 to forcibly eject ink from the nozzles 22. Alternatively, it refers to an operation of forcibly ejecting ink from the nozzles 22 of the liquid ejection head 21 by driving the suction mechanism 57 in the capping state and applying suction force to the nozzles 22 of the liquid ejection head. The cleaning process expels thickened ink, air bubbles, foreign matter, and the like, in the supply tube 27 and the liquid ejection head 21. Thereby, it is possible to repair an ejection failure of ink from the nozzles 22 of the liquid ejection head 21 to prevent the occurrence of the ejection failure of ink from the nozzles 22.

The term "flushing" refers to an ejection operation to eject droplets not related to recording from the nozzles 22. Flushing is also referred to as empty ejections. Since the flushing process expels thickened ink, air bubbles, foreign matter, and the like in the liquid ejection head 21 that cause ejection failure in the nozzles 22, it is possible to prevent clogging of the nozzles 22.

The suction mechanism 57 employs, for example, a tube pump that rotates while a roller crushes the waste liquid tube 56 to generate negative pressure on the cap 52 side of waste liquid tube 56 to suck in ink, then send the ink sucked into the waste liquid tube 56 to the waste liquid container 45.

As shown in FIG. 3 to FIG. 5, wipers 58 are located adjacent to the caps 52 on the −X direction side in the maintenance base 51. The wipers 58 are located between the cap 52 and the support section 16 in the X-axis direction. As shown in FIG. 3, the maintenance section 50 has four wipers 58 spaced apart in the Y-axis direction corresponding to the regions of the nozzle surfaces 23 where each nozzle group 22*a*, 22*b*, 22*c*, and 22*d* is located.

Figure 7:
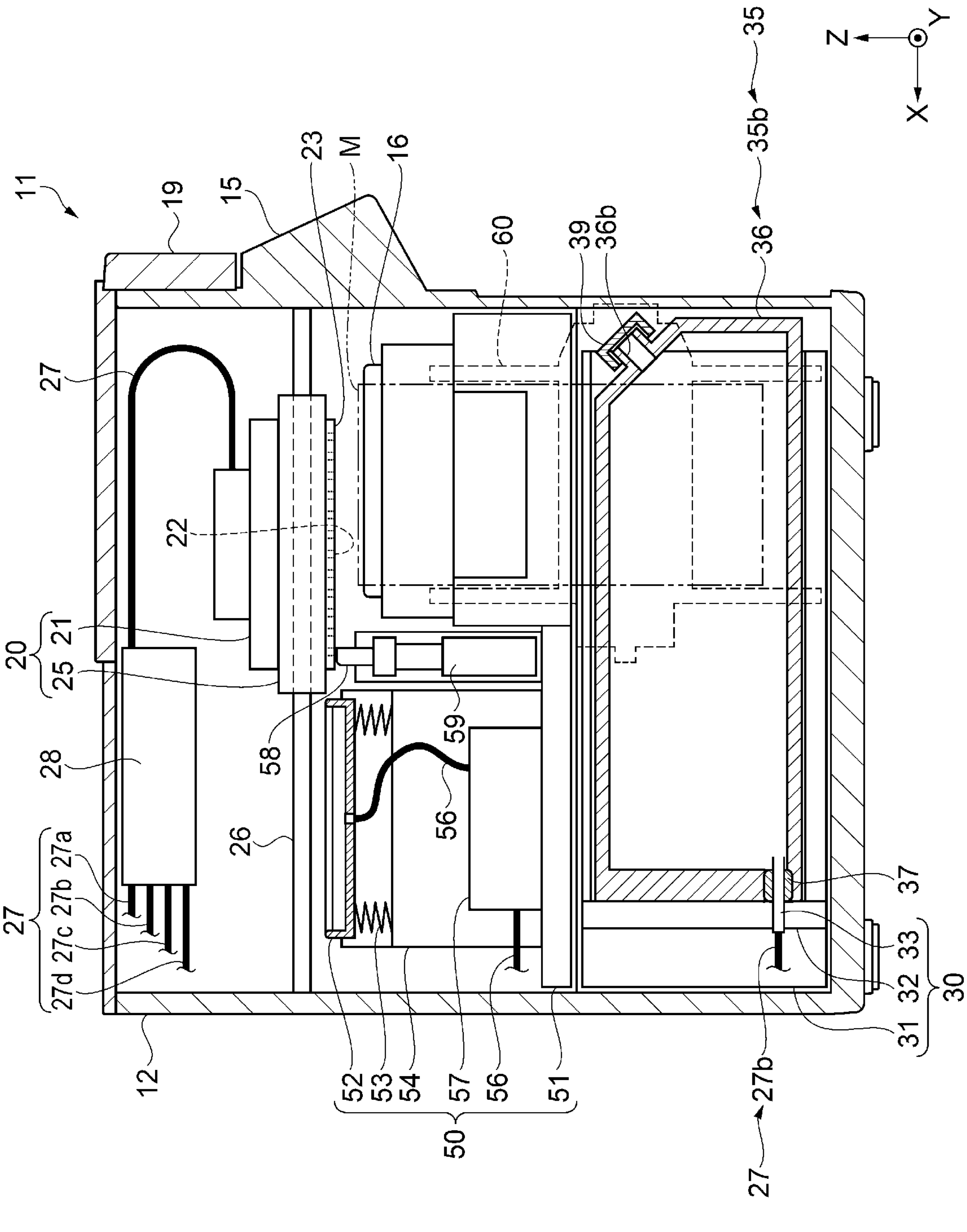
FIG. 7 is a schematic cross-sectional view showing the configuration around a liquid container according to the second embodiment.

The wipers 58 are supported by a wiper movement mechanism 59, which is movable between the wiping position shown in FIG. 7, where it can contact the nozzle surfaces 23 of the liquid ejection head 21, and the detached position shown in FIG. 4 and FIG. 5, which is away from the wiping position in the −Z direction. As shown in FIG. 7, in a state where the wipers 58 are at the wiping position, when the recording section 20 moves from the standby position SP to the recording position RP, the nozzle surfaces 23 are wiped by the wipers 58. The wiping removes ink, dust and other contaminants from the nozzle surfaces 23 of the liquid ejection head 21. Therefore, the maintenance section 50 performs maintenance of the recording section 20 by the wiping.

As shown in FIG. 3, the control section 90 is provided in the housing 12. The control section 90 has a central processing unit (CPU) (not shown) and a memory. The CPU can execute various programs stored in the memory, such as a various decisions and various instructions. The various programs are stored in the memory, including, for example, a program for transporting the medium M, a program for recording on the medium M by the recording section 20, and a program for methods of displaying a status of the liquid ejection device 11 on a display section of the operation section 15. The memory also stores various counter values, such as the length of the medium M transported from the medium set section 60.

The control section 90 controls the entire liquid ejection device 11. For example, the control section 90 controls the upstream transport section 18*a* to transport the medium M set in the medium set section 60 toward the support section 16. For example, the control section 90 controls the supply mechanism 28 to supply ink to the recording section 20 from the liquid container 35, which is mounted in the liquid container mounting section 30. For example, the control section 90 controls the recording section 20 to record by ejecting ink from the nozzles 22 of the liquid ejection head 21 onto the medium M transported to the support section 16. For example, the control section 90 controls the drive motor of the rotation shaft 71 to wind and receive the medium M recorded by the recording section 20 onto the medium receiving section 70.

For example, the control section 90 performs the maintenance of the recording section 20 by controlling one of the maintenance section 50, the recording section 20, and the supply mechanism 28. For example, the control section 90 controls the suction mechanism 57 of the maintenance section 50 to collect the ink ejected from the recording section 20 in the cap 52 into the waste liquid container 45, which is attached to the waste liquid container mounting section 40. For example, the control section 90 controls the display section of the operation section 15 to display the status of the liquid ejection device 11 on the display section of the operation section 15.

As described above, the liquid ejection device 11 according to the first embodiment can achieve the following effects.

The liquid ejection device 11 includes a medium set section 60 that is configured to set a medium M, a support section 16 that is configured to support the medium M transported from the medium set section 60, a recording section 20 that ejects ink onto the medium M supported by the support section 16, a liquid container mounting section 30 to which a liquid container 35 that contains the ink to be supplied to the recording section 20 is attachable and detachable, and a waste liquid container mounting section 40 to which a waste liquid container 45, which is configured to store the ink ejected as waste liquid from the recording section 20, is attachable and detachable. Assuming that a direction in which the medium M is transported in the support section 16 is a transport direction TD, the liquid container mounting section 30 and the waste liquid container mounting section 40 are located below the support section 16 and overlaps with the medium set section 60 as viewed from a direction along the transport direction TD. According to this, the medium set section 60 and the support section 16 are provided in a position where they do not overlap in the vertical direction. Therefore, the height of the liquid ejection device 11 can be suppressed. Furthermore, by using the layout described above, the liquid container mounting section 30 and the waste liquid container mounting section 40 can be located in a dead space created below the support section 16. Therefore, the liquid ejection device 11 can be reduced in size other than the height of the liquid ejection device 11.

The liquid container mounting section 30 and the waste liquid container mounting section 40 are adjacent to each other in a direction along the transport direction TD. According to this, the height of the liquid ejection device 11 can be further suppressed.

The liquid ejection device 11 further provided with a housing 12 which houses the medium set section 60, the liquid container mounting section 30, and the waste liquid container mounting section 40. The medium set section 60, the liquid container mounting section 30, and the waste liquid container mounting section 40 are accessible from the front side of the housing 12 in the depth direction, which intersects with the transport direction TD. According to this, it is possible to improve the user's workability.

The liquid ejection device 11 is further provided with a medium receiving section 70 that can receive the medium M recorded by the recording section 20. The liquid container mounting section 30 and the waste liquid container mounting section 40 are provided between the medium set section 60 and the medium receiving section 70 in a direction along the transport direction TD. According to this, even when the medium receiving section 70 is provided, the liquid container mounting section 30 and the waste liquid container mounting section 40 can be located in a dead space surrounded by the medium set section 60, the support section 16, and the medium receiving section 70. Therefore, the liquid ejection device 11 can be suppressed in size.

The medium set section 60 can be set with the medium M that is wound in a roll shape. According to this, the same effect can be achieved with the liquid ejection device 11 equipped with the medium set section 60 such that a medium M wound in a roll shape is set.

The liquid ejection device 11 is further provided with a maintenance section 50 that is configured to maintain the recording section 20. The recording section 20 is movable between the recording position RP, which is facing the support section 16, and the standby position SP, which is away from the recording position RP in the depth direction that intersects the transport direction TD. The maintenance section 50 is provided in a position facing the recording section 20 in the standby position SP, and, as viewed along the vertical direction, the maintenance section 50 overlaps at least a part of the liquid container 35. According to this, the increase in the footprint of the liquid ejection device 11 can be suppressed.

The liquid ejection device 11 is further equipped with an operation section 15, which is located on the front side of the housing 12 in the depth direction and is used to give various instructions. According to this, the user's workability can be further improved.

2. Second Embodiment

Figure 6:
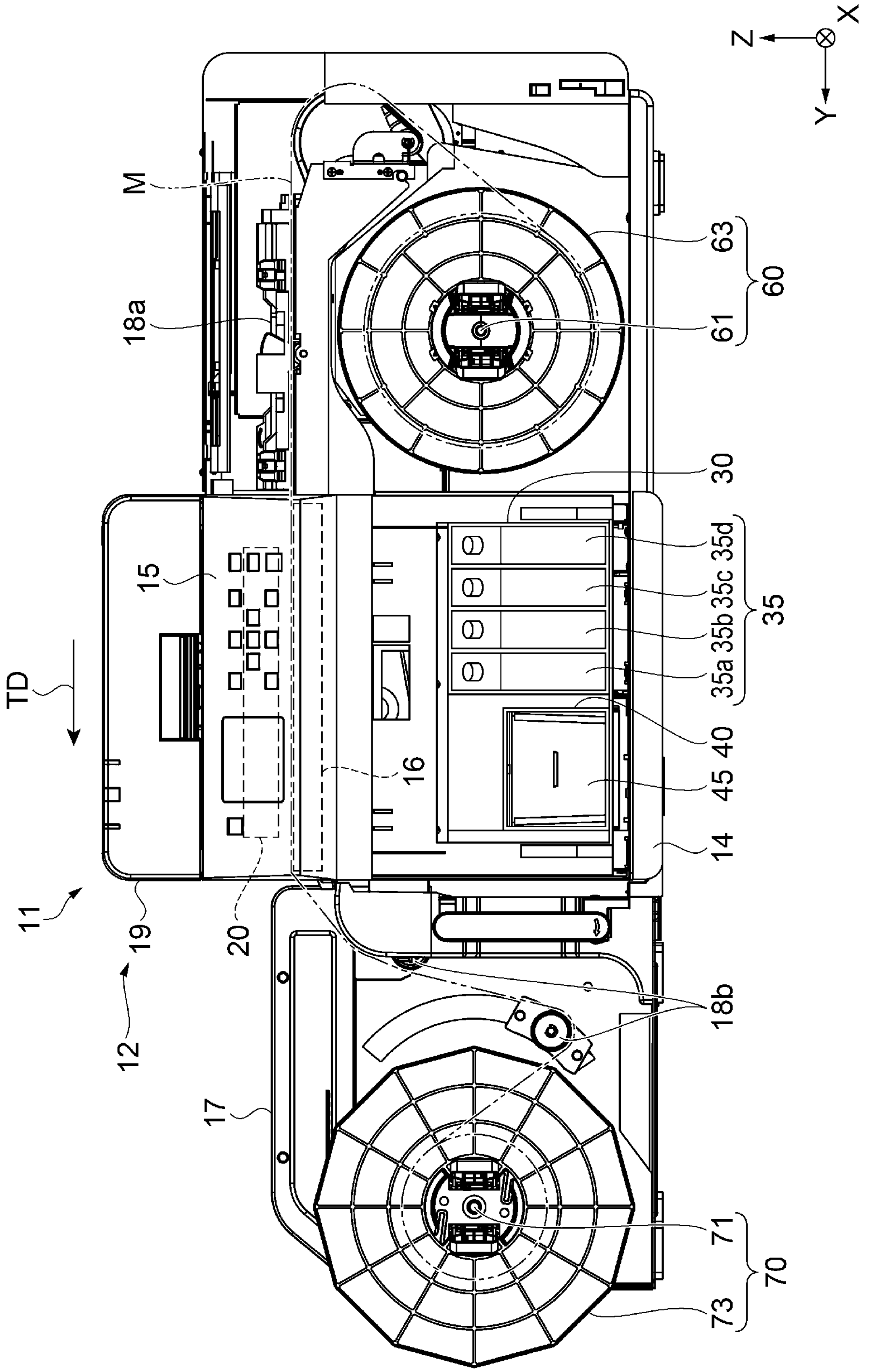
FIG. 6 is a front view of a liquid ejection device according to a second embodiment.

As shown in FIG. 6 and FIG. 7, in the liquid ejection device 11 of a second embodiment, the liquid container 35 in the first embodiment above is fixed to the liquid container mounting section 30 in such a way that the liquid container 35 cannot be attached to or detached from the liquid container mounting section 30, by making the liquid container 35 in the first embodiment above into a specification that can be refilled with ink. In other words, the liquid ejection device 11 according to the second embodiment is equipped with the liquid container 35 in the housing 12. When the liquid container 35 is attached and fixed to the housing 12, the liquid ejection device 11 does not need to have the liquid container mounting section 30.

Other configurations in the liquid ejection device 11 in the second embodiment are the same as those in the liquid ejection device 11 in the first embodiment. Note that the same reference numbers are used for the same constituent parts in the first embodiment, and redundant explanations will be omitted. FIG. 7 shows a cross section of a liquid container 35*b* in a schematic cross-sectional view of the liquid container 35.

In this embodiment, the liquid containers 35*a*, 35*b*, 35*c*, and 35*d* are located side by side at intervals in the Y-axis direction. The liquid containers 35*a*, 35*b*, 35*c*, and 35*d* are fixed to the liquid container mounting section 30 so as not to be detachable.

The liquid container 35, which is fixed to the liquid container mounting section 30, is composed of a case 36 having an ink accommodation chamber for holding ink, a lead-out port 37 for leading out the ink that is held in the case 36, and a stopper member 39 for capping an inlet 36*b* in the case 36. The inlet 36*b* is located on a side wall of the −X direction side of the case 36 with the liquid container 35 is fixed to the liquid container mounting section 30. The inlet 36*b* is located on the −X direction side than an end portion of the liquid container mounting section 30 in the −X direction side, and opens toward from the front side of the housing 12 to the front side of the depth direction of the housing 12, that is, toward diagonally upward. Thereby, while the liquid container 35 is fixed to the liquid container mounting section 30, the user can fill ink into the ink accommodation chamber of the case 36 through the inlet 36*b*.

When filling the liquid container 35 with ink, the user removes the stopper member 39 from the inlet 36*b*, inserts a mouth of an ink bottle filled with ink into the inlet 36*b*, and fills the ink into the liquid container 35. Note that in this embodiment, the liquid container 35 is fixed to the liquid container mounting section 30, so the lead-out port 37 is always connected to the lead-out pipe 33.

3. Third Embodiment

Figure 8:
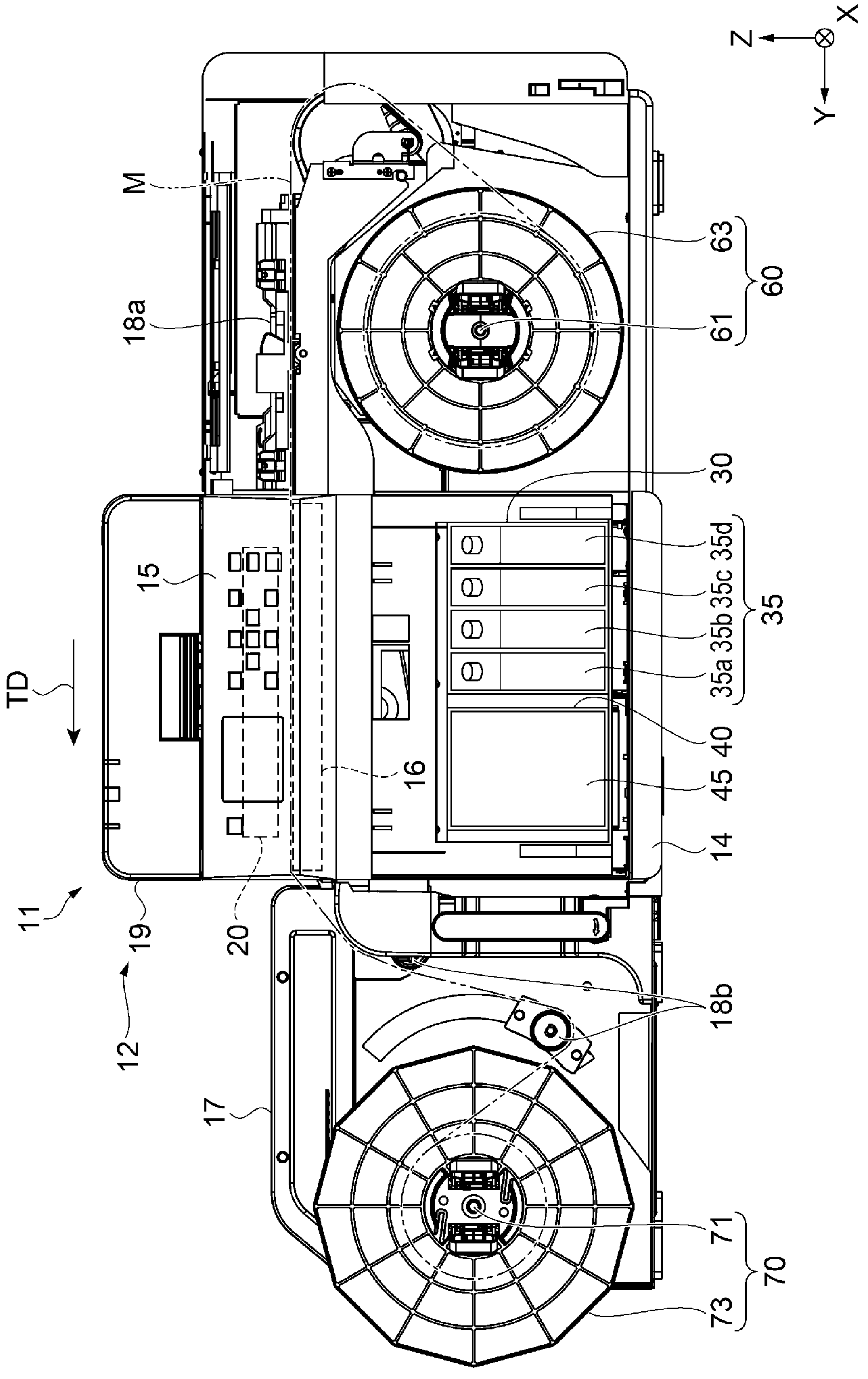
FIG. 8 is a front view of a liquid ejection device according to a third embodiment.
Figure 9:
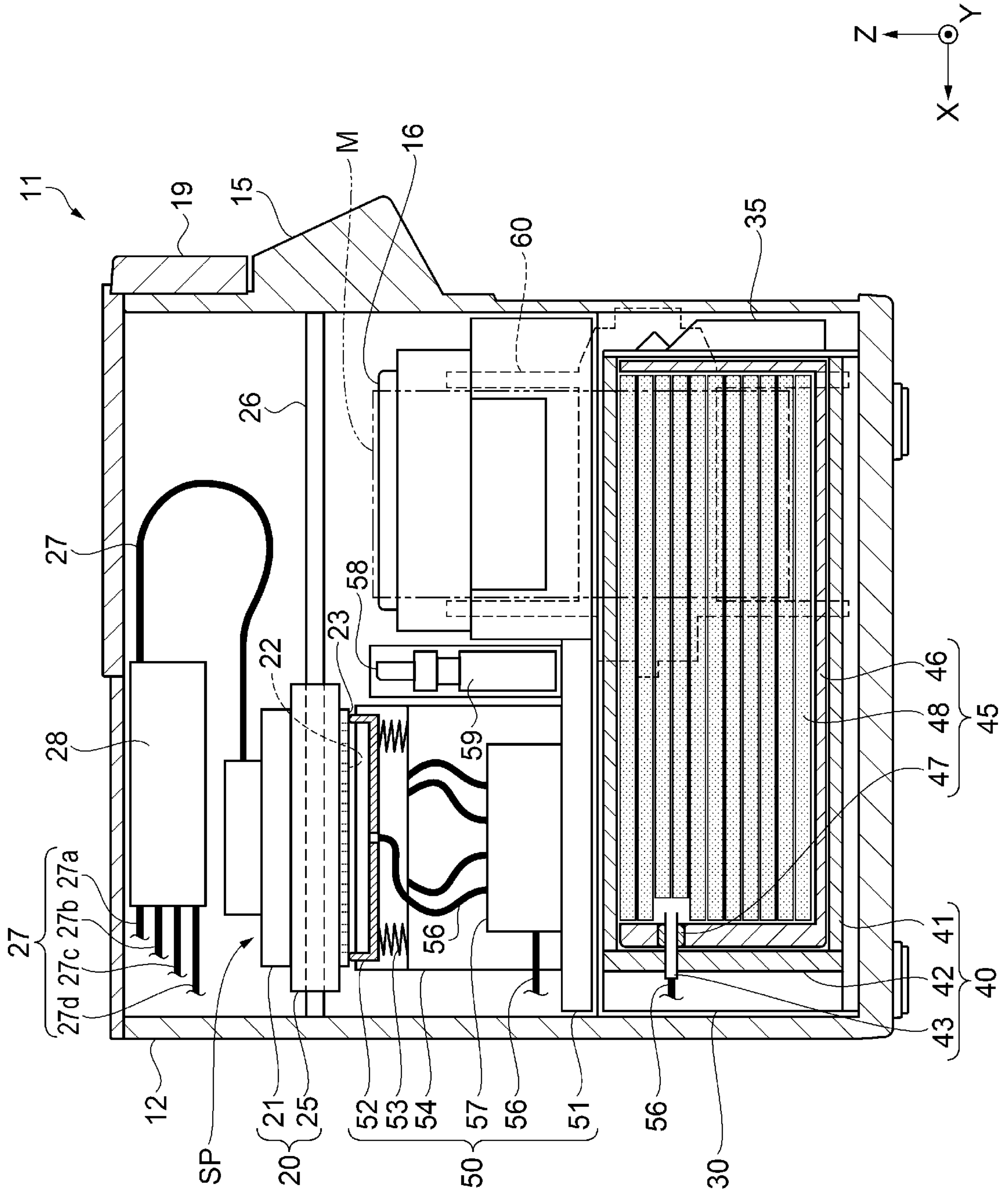
FIG. 9 is a schematic cross-sectional view showing a configuration around a waste liquid container according to the third embodiment.

As shown in FIG. 8 and FIG. 9, the liquid ejection device 11 in accordance with a third embodiment is made unnecessary to attach to and detached from the waste liquid container mounting section 40 by increasing the waste liquid container volume of the waste liquid container 45 in the above second embodiment, and the waste liquid container 45 is fixed to the waste liquid container mounting section 40 so that the waste liquid container 45 cannot be attached to or detached from the waste liquid container mounting section 40. In other words, the liquid ejection device 11 according to the third embodiment is equipped with the liquid container 35 and the waste liquid container 45 in the housing 12. When the waste liquid container 45 is attached and fixed to the housing 12, the liquid ejection device 11 does not need to have the waste liquid container mounting section 40.

Other configurations in the liquid ejection device 11 in the third embodiment are the same as those of the liquid ejection device 11 in the second embodiment. Note that the same reference numbers are used for the same constituent parts in the second embodiment, and redundant explanations will be omitted.

The waste liquid container 45 in this embodiment has larger dimensions in the X-axis and Z-axis directions of the case 46 than the case 46 in the first and second embodiments, in order to increase the amount of waste liquid that can be stored in the waste liquid container 45. The waste liquid container 45 in this embodiment has a larger absorbent material 48 than the absorbent material 48 in the first and second embodiments, to match the X-axis and Z-axis dimensions of the case 46. In addition, the waste liquid container 45 in this embodiment opens the inside of the case 46 to the atmosphere by removing the side wall on the +Z direction side of the case 46 in order to promote moisture evaporation from the waste liquid stored in the waste liquid container 45. In this way, the waste liquid container 45 is fixed to the waste liquid container mounting section 40 in a non-detachable manner, so that the waste liquid container 45 does not need to be attached to or detached from the waste liquid container mounting section 40.

Note that in this embodiment, the waste liquid container 45 is fixed to the waste liquid container mounting section 40, so the introduction port 47 is always connected to the introduction pipe 43. In addition, since the waste liquid container 45 is not attached to and detached from the waste liquid container mounting section 40, the waste liquid container 45 does not have the grip section 49 that the waste liquid container 45 of the first and second embodiments have.

As described above, the liquid ejection device 11 according to the third embodiment can achieve the following effects.

The liquid ejection device 11 includes a medium set section 60 in which the medium M is set, a support section 16 that is configured to support the medium M transported from the medium set section 60, a recording section 20 that eject ink onto the medium M supported by the support section 16 to record, a liquid container 35 that contains ink to be supplied to the recording section 20, and a waste liquid container 45 that is configured to store ink ejected as waste liquid from the recording section 20. Assuming that a direction in which the medium M is transported in the support section 16 is a transport direction TD, the liquid container 35 and the waste liquid container 45 are located below the support section 16 and overlap the medium set section 60 as viewed from a direction along the transport direction TD. According to this, the medium set section 60 and the support section 16 are provided in a position where they do not overlap in the vertical direction. Therefore, the height of the liquid ejection device 11 can be suppressed. Furthermore, by using the layout described above, the liquid container 35 and the waste liquid container 45 can be located in a dead space created below the support section 16. Therefore, the liquid ejection device 11 can be reduced in size other than the height of the liquid ejection device 11.

The liquid container 35 and the waste liquid container 45 are adjacent to each other in a direction along the transport direction TD. According to this, the height of the liquid ejection device 11 can be further suppressed.

The liquid ejection device 11 further provided with a medium receiving section 70 that is configured to receive the medium M recorded by the recording section 20. The liquid container 35 and the waste liquid container 45 are provided between the medium set section 60 and the medium receiving section 70 in a direction along the transport direction TD. According to this, even when the medium receiving section 70 is provided, the liquid container 35 and the waste liquid container 45 can be located in a dead space surrounded by the medium set section 60, the support section 16, and the medium receiving section 70. Therefore, the liquid ejection device 11 can be suppressed in size.

The medium set section 60 can be set with the medium M that is wound in a roll shape. According to this, the same effect can be achieved with the liquid ejection device 11 equipped with the medium set section 60 such that a medium M wound in a roll shape is set.

The liquid ejection device 11 is further provided with a maintenance section 50 that is configured to maintain the recording section 20. The recording section 20 is movable between the recording position RP, which is facing the support section 16, and the standby position SP, which is away from the recording position RP in the depth direction that intersects the transport direction TD. The maintenance section 50 is provided in a position facing the recording section 20 in the standby position SP, and, as viewed along the vertical direction, the maintenance section 50 overlaps at least a part of the liquid container 35. According to this, the increase in the footprint of the liquid ejection device 11 can be suppressed.

The liquid ejection device 11 is further equipped with an operation section 15, which is located on the front side of the housing 12 in the depth direction and is used to give various instructions. According to this, the user's workability can be further improved.

4. Fourth Embodiment

The liquid ejection device 11 according to a forth embodiment is a liquid ejection device in which the waste liquid container 45 in the first embodiment above is changed to the waste liquid container 45 in the third embodiment above, so that the waste liquid container 45 does not need to be attached to and detached from the waste liquid container mounting section 40 and is fixed to the waste liquid container mounting section 40 so that the waste liquid container 45 cannot be attached to and detached from the waste liquid container mounting section 40. In other words, the liquid ejection device 11 according to the fourth embodiment is equipped with the liquid container mounting section 30 and the waste liquid container 45 in the housing 12. Other configurations in the liquid ejection device 11 in the fourth embodiment are the same as those of the liquid ejection device 11 in the first embodiment.

As described above, the liquid ejection device 11 according to the fourth embodiment can achieve the following effects.

The liquid ejection device 11 includes a medium set section 60 in which the medium M is set, a support section 16 that is configured to support the medium M transported from the medium set section 60, a recording section 20 that ejects ink onto the medium M supported by the support section 16, a liquid container mounting section 30 to which a liquid container 35 that contains the ink to be supplied to the recording section 20 is attachable and detachable, and a waste liquid container 45 that is configured to store ink ejected as waste liquid from the recording section 20. Assuming that a direction in which the medium M is transported in the support section 16 is a transport direction TD, the liquid container mounting section 30 and the waste liquid container 45 are located below the support section 16 and overlaps the medium set section 60 as viewed from a direction along the transport direction TD. According to this, the medium set section 60 and the support section 16 are provided in a position where they do not overlap in the vertical direction. Therefore, the height of the liquid ejection device 11 can be suppressed. Furthermore, by using the layout described above, the liquid container mounting section 30 and the waste liquid container 45 can be located in a dead space created below the support section 16. Therefore, the liquid ejection device 11 can be reduced in size other than the height of the liquid ejection device 11.

The liquid container mounting section 30 and the waste liquid container 45 are adjacent to each other in the direction along the transport direction TD. According to this, the height of the liquid ejection device 11 can be further suppressed.

The liquid ejection device 11 further provided with a housing 12 which houses the medium set section 60 and the liquid container mounting section 30. The medium set section 60 and the liquid container mounting section 30 are accessible from the front side of the housing 12 in the depth direction, which intersects the transport direction TD. According to this, it is possible to improve the user's workability.

The liquid ejection device 11 further provided with a medium receiving section 70 that can receive the medium M recorded by the recording section 20. The liquid container mounting section 30 and the waste liquid container 45 are provided between the medium set section 60 and the medium receiving section 70 in the direction along the transport direction TD. According to this, even when the medium receiving section 70 is provided, the liquid container mounting section 30 and the waste liquid container 45 can be located in a dead space surrounded by the medium set section 60, the support section 16, and the medium receiving section 70. Therefore, the liquid ejection device 11 can be suppressed in size.

The medium set section 60 can be set with the medium M that is wound in a roll shape. According to this, the same effect can be achieved with the liquid ejection device 11 equipped with the medium set section 60 such that a medium M wound in a roll shape is set.

The liquid ejection device 11 is further provided with a maintenance section 50 that can maintain the recording section 20. The recording section 20 is movable between the recording position RP, which is facing the support section 16, and the standby position SP, which is away from the recording position RP in the depth direction that intersects the transport direction TD. The maintenance section 50 is located facing the recording section 20 in the standby position SP, and, as viewed along the vertical direction, the maintenance section 50 overlaps at least a part of the liquid container mounting section 30. According to this, the increase in the footprint of the liquid ejection device 11 can be suppressed.

The liquid ejection device 11 is further equipped with an operation section 15, which is located on the front side of the housing 12 in the depth direction and is used to give various instructions. According to this, the user's workability can be further improved.

The liquid ejection device 11 in the above embodiments of the present disclosure is based on the configurations described above, but it is of course possible to change or omit portions of the configuration to the extent that it does not depart from the gist of the present disclosure. In addition, the above embodiments and other embodiments described below can be implemented in combination with each other within a range that does not technically conflict. Other embodiments will be described below.

In the above embodiments, the medium M set in the medium set section 60 does not have to be a medium M that is wound in a roll shape. For example, the medium M set in the medium set section 60 may be a sheet of medium M. In this case, the medium set section 60 may be a cassette that can accommodate multiple mediums M. In addition, the liquid ejection device 11 may be equipped with a plurality of cassettes as the medium set section 60, stacked in the Z-axis direction. In this case, the cassette as the medium set section 60 is located on the −Y direction side from the center of the housing 12, and can be slid in the X-axis direction. In this case, the medium receiving section 70 may be a plate-shaped tray that can receive the sheet of medium M on recorded by the recording section 20. In this case, the medium receiving section 70 is located on the +Y direction side from the support section 16.

In the above embodiments, the liquid ejection device 11 may be equipped with a cutting mechanism that cuts the medium M, which is transported from the medium set section 60 to the support section 16 and recorded by the recording section 20, into single sheets. In this case, the medium receiving section 70 may be a plate-shaped tray that can receive the medium M that has been recorded by the recording section 20 and cut into sheets by the cutting mechanism. In this case, the medium receiving section 70 is located on the +Y direction side from the support section 16.

In the above embodiments, the liquid container mounting section 30 may not have to extend from an end portion on the −X direction side in the housing 12 to a position that is vertically below the maintenance section 50 in the X-axis direction, which is the depth direction of the housing 12. In this case, the liquid container mounting section 30 and the liquid container 35 mounted on the liquid container mounting section 30 are located in the −Z direction, which is vertically below the support section 16, and overlap the medium set section 60 as viewed from the direction along the Y axis.

In the above embodiments, the waste liquid container mounting section 40 does not have to extend from an end portion on the −X direction side in the housing 12 to a position that is vertically below the maintenance section 50 in the X-axis direction, which is the depth direction of the housing 12. In this case, the waste liquid container mounting section 40 and the waste liquid container 45 mounted on the waste liquid container mounting section 40 are also located in the −Z direction, which is vertically below the support section 16, and overlap with the medium set section 60 as viewed from the direction along the Y axis.

In the above embodiments, the maintenance section 50 need not be located adjacent to the +X direction side of the support section 16. For example, the maintenance section 50 may be located adjacent to the +Y direction side of the support section 16. In this case, the head holding section 25 is supported by the guide shaft 26 so as to be movable in the Y-axis direction. The head holding section 25 that holds the liquid ejection head 21 is movably supported in the Y-axis direction by the guide shafts 26, and the recording section 20 is located in the housing 12 so as to be movable between the recording position RP, which is facing the support section 16, and the standby position SP, which is away from the recording position RP in the +Y direction. In the standby position SP, the recording section 20 faces the maintenance section 50 located on the +Y direction side of the support section 16. In this case, the medium receiving section 70 may be located on the −Z direction side, which is vertically below the maintenance section 50, and located on the +Y direction side from the support section 16.

What is claimed is:

1. A liquid ejection device comprising:
a medium set section that is configured to set a medium;
a support section that is configured to support the medium transported from the medium set section;
a recording section that has a nozzle that opens onto a nozzle surface and ejects liquid from the nozzle onto the medium supported by the support section to record on the medium;
a maintenance section that is configured to maintain the recording section;
a housing including:
a liquid container mounting section to which a liquid container that contains the liquid to be supplied to the recording section is attachable and detachable, wherein
the maintenance section is provided at a position that overlaps at least a part of the liquid container mounting section as viewed along a vertical direction; and
a waste liquid container mounting section to which a waste liquid container, which is configured to store the liquid discharged as waste liquid from the recording section, is attachable and detachable, wherein
assuming that a direction in which the medium is transported vertically below the nozzle surface while supported by the support section is a transport direction, the liquid container mounting section and the waste liquid container mounting section are provided at a position below the support section, the liquid container mounting section and the waste liquid container mounting section being provided at a position that overlaps with the medium set section as viewed from a direction along the transport direction,
the liquid container mounting section is adjacent to the waste liquid container mounting section in the direction along the transport direction,
the liquid container and the waste liquid container are configured to be accessed from a front side of the housing in a depth direction of the housing, and
the depth direction intersects the transport direction; and
a medium receiving section configured to receive the medium on which the recording was performed by the recording section, wherein
the medium receiving section includes a medium winding section and a flange,
the medium winding section includes a cylindrical section,
the flange includes a through hole into which the cylindrical section of the medium winding section is inserted, and
the liquid container mounting section and the waste liquid container mounting section are provided between the medium set section and the medium receiving section in the direction along the transport direction.

2. The liquid ejection device according to claim 1, wherein
the housing houses the medium set section, and
the medium set section is configured to be accessed from the front side of the housing in the depth direction of the housing.

3. The liquid ejection device according to claim 2, further comprising an operation section for providing various instructions, wherein the operation section is provided on the front side of the housing in the depth direction.

4. The liquid ejection device according to claim 1, wherein the medium set section is configured to set the medium wound in a roll shape.

5. A liquid ejection device comprising:
a medium set section where a medium is set;
a support section that is configured to support the medium transported from the medium set section;
a recording section that has a nozzle that opens onto a nozzle surface and ejects liquid from the nozzle onto the medium supported by the support section to record on the medium;
a maintenance section that is configured to maintain the recording section;
a housing including:
a liquid container mounting section to which a liquid container that contains the liquid to be supplied to the recording section is attachable and detachable, wherein
the maintenance section is provided at a position that overlaps at least a part of the liquid container mounting section as viewed along a vertical direction; and
a waste liquid container that is configured to store the liquid discharged as waste liquid from the recording section, wherein
assuming that a direction in which the medium is transported vertically below the nozzle surface while supported by the support section is a transport direction, the liquid container mounting section and the waste liquid container are provided at a position below the support section, the liquid container mounting section and the waste liquid container being provided at a position that overlaps with the medium set section as viewed from a direction along the transport direction, the liquid container mounting section is adjacent to the waste liquid container in the direction along the transport direction, the liquid container mounting section and the waste liquid container are configured to be accessed from a front side of the housing in a depth direction of the housing, and the depth direction intersects the transport direction; and a medium receiving section configured to receive the medium on which the recording was performed by the recording section, wherein the medium receiving section includes a medium winding section and a flange, the medium winding section includes a cylindrical section, the flange includes a through hole into which the cylindrical section of the medium winding section is inserted, and the liquid container mounting section and the waste liquid container are provided between the medium set section and the medium receiving section in the direction along the transport direction.

6. The liquid ejection device according to claim 1, wherein the recording section is configured to move between a recording position and a standby position, the recording section faces the support section in the recording position, the standby position is away from the recording position in the depth direction, and the maintenance section is provided at a position facing the recording section in the standby position.

7. The liquid ejection device according to claim 6, wherein the maintenance section includes a cap and wipers, the wipers are between the cap and the support section, the wipers are movable between a wiping position and a detached position, the wiping position is a position at which the wipers contact the recording section, the detached position is away from the wiping position, and the cap is provided at a position facing the recording section in the standby position.

8. The liquid ejection device according to claim 5, wherein the medium set section is configured to set the medium wound in a roll shape.

9. The liquid ejection device according to claim 5, wherein the housing houses the medium set section, and the medium set section is configured to be accessed from the front side of the housing in the depth direction.

10. The liquid ejection device according to claim 9, further comprising an operation section for providing various instructions, wherein the operation section is provided on the front side of the housing in the depth direction.

11. The liquid ejection device according to claim 5, wherein the recording section is configured to move between a recording position and a standby position, the recording section faces the support section in the recording position, the standby position is away from the recording position in the depth direction, and the maintenance section is provided at the position facing the recording section in the standby position.

12. The liquid ejection device according to claim 11, wherein the maintenance section includes a cap and wipers, the wipers are between the cap and the support section, the wipers are movable between a wiping position and a detached position, the wiping position is a position at which the wipers contact the recording section, the detached position is away from the wiping position, and the cap is provided at a position facing the recording section in the standby position.

13. A liquid ejection device comprising:

a medium set section where a medium is set;

a support section that is configured to support the medium transported from the medium set section;

a recording section that has a nozzle that opens onto a nozzle surface and ejects liquid from the nozzle onto the medium supported by the support section to record on the medium;

a maintenance section that is configured to maintain the recording section;

a housing including:

a liquid container that contains the liquid to be supplied to the recording section, wherein the maintenance section is provided at a position that overlaps at least a part of the liquid container as viewed along a vertical direction; and a waste liquid container that is configured to store the liquid discharged as waste liquid from the recording section, wherein assuming that a direction in which the medium is transported vertically below the nozzle surface while supported by the support section is a transport direction, the liquid container and the waste liquid container are provided at a position below the support section, the liquid container and the waste liquid container being provided at a position that overlaps with the medium set section as viewed from a direction along the transport direction, the liquid container is adjacent to the waste liquid container in the direction along the transport direction, the liquid container and the waste liquid container are configured to be accessed from a front side of the housing in a depth direction of the housing, and the depth direction intersects the transport direction; and a medium receiving section configured to receive the medium on which the recording was performed by the recording section, wherein the medium receiving section includes a medium winding section and a flange, the medium winding section includes a cylindrical section, the flange includes a through hole into which the cylindrical section of the medium winding section is inserted, and the liquid container and the waste liquid container are provided between the medium set section and the medium receiving section in the direction along the transport direction.

14. The liquid ejection device according to claim 13, wherein the medium set section is configured to set the medium wound in a roll shape.

15. The liquid ejection device according to claim 13, wherein the recording section is configured to move between a recording position and a standby position, the recording section faces the support section in the recording position, the standby position is away from the recording position in the depth direction, and the maintenance section is provided at a position facing the recording section in the standby position.

16. The liquid ejection device according to claim 15, wherein the maintenance section includes a cap and wipers, the wipers are between the cap and the support section, the wipers are movable between a wiping position and a detached position, the wiping position is a position at which the wipers contact the recording section, the detached position is away from the wiping position, and the cap is provided at a position facing the recording section in the standby position.

* * * * *